United States Patent
Muijs et al.

(10) Patent No.: US 11,049,473 B2
(45) Date of Patent: Jun. 29, 2021

(54) APPARATUSES AND METHODS FOR ANALYZING IMAGE GRADINGS

(75) Inventors: Remco Theodorus Johannes Muijs, Meteren (NL); Mark Jozef Willem Mertens, Eindhoven (NL); Wilhelmus Hendrikus Alfonsus Bruls, Eindhoven (NL); Chris Damkat, Eindhoven (NL); Martin Hammer, Arendonk (BE); Cornelis Wilhelmus Kwisthout, Breda (NL)

(73) Assignee: Koninklijke Philips N.V., Eindhoven (NL)

( * ) Notice: Subject to any disclaimer, the term of this patent is extended or adjusted under 35 U.S.C. 154(b) by 165 days.

(21) Appl. No.: 14/003,832

(22) PCT Filed: Mar. 19, 2012

(86) PCT No.: PCT/IB2012/051296
§ 371 (c)(1),
(2), (4) Date: Sep. 9, 2013

(87) PCT Pub. No.: WO2012/127401
PCT Pub. Date: Sep. 27, 2012

(65) Prior Publication Data
US 2014/0002479 A1 Jan. 2, 2014

Related U.S. Application Data

(60) Provisional application No. 61/563,129, filed on Nov. 23, 2011.

(30) Foreign Application Priority Data

Mar. 24, 2011 (EP) .................... 11159503

(51) Int. Cl.
*G09G 5/10* (2006.01)
*G06T 5/50* (2006.01)
*G06T 5/00* (2006.01)

(52) U.S. Cl.
CPC ............... *G09G 5/10* (2013.01); *G06T 5/007* (2013.01); *G06T 5/50* (2013.01);
(Continued)

(58) Field of Classification Search
None
See application file for complete search history.

(56) References Cited

U.S. PATENT DOCUMENTS

2009/0175338 A1 7/2009 Segall
2010/0046855 A1* 2/2010 Marcu et al. ................ 382/284
(Continued)

FOREIGN PATENT DOCUMENTS

EP 1827024 A1 8/2007
WO WO2007082562 A2 7/2007
(Continued)

OTHER PUBLICATIONS

Smith K. et al., "Beyond Tone Mapping: Enhanced Depiction of Tone Mapped HDR Images", Computer Graphics Forum, Eurographics, vol. 25, No. 3, Sep. 1, 2006, pp. 427-438, XP55138773.
(Continued)

*Primary Examiner* — Ryan McCulley

(57) ABSTRACT

The method of analyzing a difference of at least two gradings of an image on the basis of: obtaining a first graded picture (LDR) with a first luminance dynamic range; obtaining data encoding a grading of a second graded picture (HDR) with a second luminance dynamic range, different from the first luminance dynamic range; determining a grading difference data structure (DATGRAD) on the basis of at least the data encoding the grading of the second graded (Continued)

picture (HDR), allows more intelligently adaptive encoding of the imaged scenes, and consequently also better use of those pictures, such as higher quality rendering under various rendering scenarios.

17 Claims, 8 Drawing Sheets

(52) U.S. Cl.
CPC .............. *G06T 2207/20208* (2013.01); *G09G 2320/0613* (2013.01); *G09G 2320/0626* (2013.01)

(56) References Cited

U.S. PATENT DOCUMENTS

2010/0172411 A1* 7/2010 Efremov et al. ......... 375/240.12
2010/0183071 A1* 7/2010 Segall et al. ............. 375/240.16
2013/0038790 A1* 2/2013 Seetzen et al. ................ 348/453
2014/0002737 A1* 1/2014 Damberg et al. ............. 348/488

FOREIGN PATENT DOCUMENTS

| WO | WO2010021705 A1 | 2/2010 |
| WO | WO2010105036 A1 | 9/2010 |
| WO | WO2012004709 A1 | 1/2012 |

OTHER PUBLICATIONS

Mantiuk, R. et al., "Backward-Compatible High Dynamic Range MPEG Video Vompression". ACM Trans. Graph. vol. 25, No. 3, Jul. 2006, 713-723.

* cited by examiner

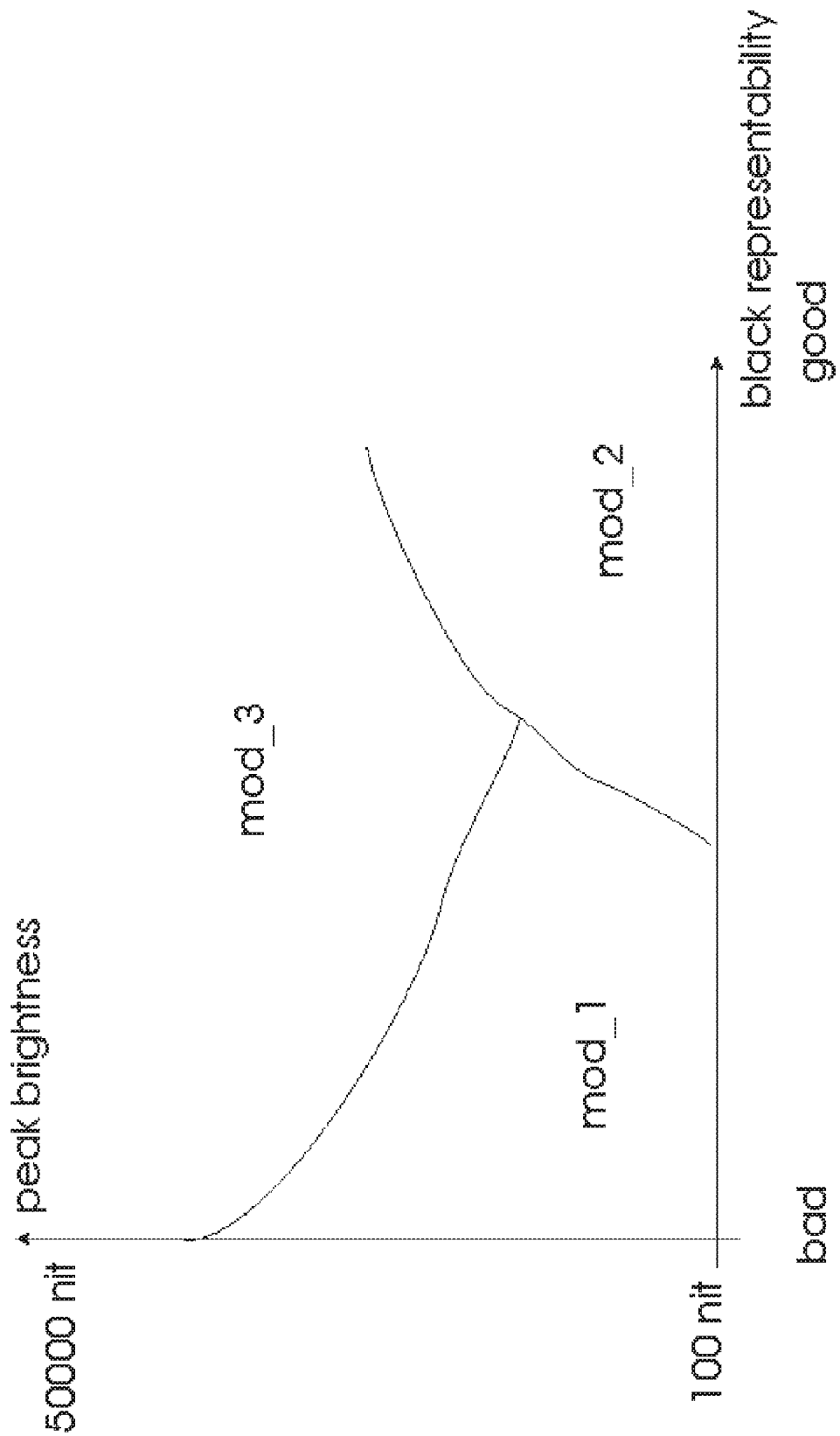

APPARATUSES AND METHODS FOR ANALYZING IMAGE GRADINGS

FIELD OF THE INVENTION

The invention relates to methods and apparatuses for comparing different gradings, in particular an LDR and HDR variant, and resulting products such as signals and carriers carrying those signals, which at least comprise a data structure describing the difference between the two gradings.

BACKGROUND OF THE INVENTION

Rendering and encoding color pictures, whether to faithfully represent a captured scene, or an artistic graded variant thereof, has always been an elusive problem, not in the least because of the complex adaptive behavior of human vision. Classical television encoding solved this problem by assuming that the content is only rendered on a single typical CRT display, under average viewing conditions. This led to closed (and relatively simple) systems such as the NTSC system, or more recently MPEG2, which assume that colors (by which we mean both primarily its luminance and secondarily its chromatic components) are represented relatively correctly (or at least as desirable, since there is a gap between the scene and display gamut), if the viewing environment conforms to the presumptions. Also, relatively simple color transformations where defined thereupon, e.g. the matrixing to an RGB driving system for the different primaries of a particular LCD display, or white point adaptations, etc., which, if not improving the color rendering in that the resulting rendered picture would, given the minor deviations, conform more closely to rendering on the reference (CRT) display, at least would not make more severe color rendering errors than those that were already acceptable under the paradigm. However, this closed system was opened up because more and more very different kinds of devices were attached to the television system in the last decade, under the same color management philosophy. Not only did it become possible to render consumer still pictures from any camera on say an LCD television (with a particular contrast, gamma, etc.), but also the different displays grew apart as to their physical characteristics (in particular the color gamuts they could render), and viewing environments became variable as well (e.g. outdoor mobile television viewing, home cinema, etc.). In particular, when displays with ever increasing white luminances (e.g. 2000 Cd/m2) started (or will) coming to the market, simultaneous with cameras with increased depth photon capturing wells and ADCs, it became customary to start talking about a division into two subregions, namely the standard display system which may be called low dynamic range (LDR), and a system with vastly increased luminance rendering capabilities being called high dynamic range (HDR). If one understands that an LDR encoded signal may have seriously deteriorated the characteristics of the image for certain ranges which can be or need to be displayed on a HDR display (e.g. by clipping highlights), one understands that generating a nice picture for such HDR displays may become, under such major deviations from the LDR reference system, a task far more daunting than a simple color transformation (one really has to exploit the gamut of the HDR display to the maximum). Since there is obviously a need to be able generate display driving settings which render pictures on the HDR displays of a visual quality conforming to the higher price of such an improved HDR display, one understands the need of having new encodings, new image processing techniques, new rendering methods, etc. In this patent application, we look at the problem more generically, in that whatever the display (of which there are many more than just two, whether HDR—which can be of several qualities, e.g. 1000 nit white, or 5000 nit white- or even of lesser quality than LDR, which one may call sub-LDR [SLDR]), and further circumstances, we would like to be able to render improved pictures, given the information at hand.

SUMMARY OF THE INVENTION

Our below technical solutions are inspired by an object to improve all kinds of grading-, compression-, and HDR systems. As is known to the skilled person, grading has a commonly known meaning comprising the artistic improvement of all colors (/luminances), so that the image looks optimal. In practice camera capturing can hardly generate the exact look i.e. luminances for all objects in the scene, so typically a grader recolors local regions, making a face more bright e.g., or even applying more advanced special effects, like e.g. adding a bumpy skin. Although the methods (and apparatuses) described can deal with generating an optimal rendering for any display, they are mainly useful for higher dynamic range displays (above say 500 nit peak brightness), and then based on grading information related to high dynamic range variant images of a captured scene (whether additional to an LDR grading, or as separate HDR information). They are especially valuable for analyzing and handling coded information for higher brightness regions, such as sunny outdoors or lamps, but also for dark regions, where a smart handling of the rendering of those regions becomes more important. Although one could in principle start with some of the embodiments with a HDR signal and some generic standard reference LDR (e.g. automatically derived from the HDR), the present methods will be mostly usable when at least two gradings exist, typically one for lower and one for higher dynamic ranges.

The comparison unit 110 and corresponding method is arranged to do an accurate comparison of regions (e.g. objects, (sets of) pixels) in two gradings of an image (i.e. two gradings of the same time instant), i.e. compare what the pixel values (at least luminance or a correlate thereof, but possibly also 3- or N-dimensional color, or further image attributes relatable to a pixel, such as e.g. local estimated illumination) of the first and second grading are, and represent this specific difference in grading informaion in a well-manageable manner (which can be used in further processing) in a grading difference data structure DAT-GRAD. This data can be used on a receiving side to understand how at least two variants of a theoretically infinite set of scene renderings look. I.e., these two may e.g. comprise (purely camera-based) a somewhat plain LDR version of a scene, and the same with higher and/or lower luminance regions accurately captured. However, it may further comprise information of how these subregions are best to be rendered on several displays (of which at least two characteristic reference displays have a specified rendering), e.g. reducing a bright region so that it doesn't become too conspicuous or irritating, as determined by a human grader. Starting from this important information, the receiving side can better determine what is intended, and therefrom create more appropriate renderings for actual displays, e.g. intermediate the two reference gradings.

This can be done in a number of ways, such as e.g.:

A method of analyzing a difference of at least two gradings of an image on the basis of:

obtaining a first graded picture (LDR) with a first luminance dynamic range;

obtaining data encoding a grading of a second graded picture (HDR) with a second luminance dynamic range, different from the first luminance dynamic range;

determining a grading difference data structure (DATGRAD) on the basis of at least the data encoding the grading of the second graded picture (HDR).

This grading difference can be determined on the basis of however the HDR is encoded, e.g. by looking at a modification function for a region, or a subpicture encoding a part of the scene as a separate image for regions of high luminance. The grading difference data structure (DATGRAD) may typically identify where spatially some regions exist which are different as HDR, and typically possibly also how they are different, e.g. that they are to be boosted 1.5× in luminance compared to where on the luminance range they would fall when a single mapping (e.g. a gamma transformation) was applied on the entire image (i.e. a mapping which is good for the darker luminances of say an LDR range). A receiving side display system can then try to conform to this 1.5× boost, depending on of course how much physical gamut it has available for such boost (e.g. by darkening luminances below those corresponding to bright regions).

A method, in which the data encoding the grading of a second graded picture (HDR) is the second graded picture (HDR), and the step of determining a grading difference data structure (DATGRAD) comprises comparing pixel values of the first graded image (LDR) and the second graded image (HDR), of at least a spatial or luminance region of one of the first graded picture (LDR) and the second graded picture (HDR).

Of course the comparison can be done on actual HDR picture as graded, i.e. e.g. a 18 bit linear luminance encoded RAW image. Pre-mappings may then be used to bring the two gradings to a same format, e.g. a 32 bit linear space, by applying certain inverse encoding gammas, stretching, doing a standard LDR-to-HDR algorithm (e.g. inverse S-curve) etc. What remains then as a difference is typically what the grader intended as a best look on brighter (HDR) displays versus less bright (LDR) ones.

A method, in which the grading difference data structure (DATGRAD) comprises a spatial region of interest (RI) of the image, indicating a presence or amount, according to a criterion, of a difference of grading in the spatial region for the first graded picture (LDR) versus the second graded picture (HDR).

This allows quick identification of special regions for making particular renderings, e.g. HDR effects, which may then be generated by applying special transformation functions, looking up in memory additional data for those regions, for doing the transformation (e.g. correction values for certain pixels), or even applying functions like e.g. a computer graphics (re)generation function on that region. An amount of HDR effect can be as simple as an amount to boost of e.g. a bright region compared to the rest of the image which may result from e.g. a simple tone (i.e. typically luminance) mapping from an LDR grading, via a mapping which e.g. largely preserves the initial (darker) values of the LDR pixel luminances.

A method further comprising the step of deriving a third graded picture (MDR) on the basis of the grading difference data structure (DATGRAD).

Typically an intermediate image will be generated, e.g. for directly driving a display, or in a reference color space, from which final display driving values can be derived.

A method further comprising applying an image processing transformation on at least one of the first, second or third graded pictures, such as e.g. a picture-adaptive scaling, or a picture sharpening.

Pictures can be further optimized, especially intelligently given all available different grading data. E.g. if contrast for a region has been lost in an intermediate lower range grading (MDR), that may be psychovisually compensated by e.g. increasing local sharpness (e.g. of fine-range patterns), or changing color saturation, etc.

A method further comprising deriving an image description (IMDESC) on the basis of the grading difference data structure (DATGRAD), such as e.g. a color specification of a spatial region of the image.

A method in which the luminances of pixels in the third graded picture (MDR) fall within at least one variance range around the luminances of pixels in the first graded picture (LDR), in particular in which the third graded picture (MDR) is a visual quality improvement of the first graded picture (LDR), according to a visual quality property such as sharpness, or a compression artefacts measure.

Of course the MDR picture may also be an improvement of an LDR picture given the complementary information in the HDR grade. E.g. the LDR grade may be a legacy grade as previously derived, but that may be co-encoded with a HDR-remastering, which may be used for obtaining further LDR grades at the receiving side. In this case MDR doesn't have an intermediate peak brightness (e.g. 2000 nit between 5000 nit and 500 nit), but it may have a peak brightness similar to 500 nit (i.e. well displayable or intended to be used on displays with an actual peak brightness between e.g. 700 nit and 100 nit).

A method in which the deriving of the third graded picture (MDR) is done based on obtained information on the characteristics (VCHAR) of a viewing environment. Here e.g. what is still visible in the darker parts of any grading may be finetuned, e.g. with a special mapping for the darker ranges of any image grading.

A method in which the deriving of the third graded picture (MDR) is done based on a user-controlled setting (USRSET) relating to display of the third graded picture (MDR), such as e.g. a setting specifying an annoyance of a light output, a setting limiting power usage, or a setting specifying preferred visual attributes of the displayed third graded picture (MDR).

Intermediate gradings also allow (even on a single display) that a user has better control over the final look. But so has the content creator (e.g. Hollywood), since this will be done smartly on the basis of the two gradings (i.e. with this the creator at least implicitly—or even explicitly with further encoded scene characterizing information or instructions—conveys how different subranges of luminance—e.g. HDR effects—should look if a user e.g. reduces rendering brightness).

A method in which the third graded picture (MDR) is derived as an intermediate picture, as measureable according to a brightness criterion, between the first graded picture (LDR) and the second graded picture (HDR).

E.g. the peak brightness will be in-between both peak brightnesses, or an average of several brightnesses along a scale, e.g. when applying a tone mapping (e.g. a preferred or typical display gamma) to a standard signal such as a grey bar chart, etc.

A method in which the deriving of the third graded picture is done at least in part based on an inverse tone mapping (ITM) of a tone mapping transforming the first graded picture (LDR) into an approximation of the second graded picture (HDR). In this way new LDR variants may be calculated, e.g. serving as a basis for further encoding (e.g. over a connection to a further apparatus using the signal), or having better image properties according to an image quality measure.

All these methods may also be embodied as apparatuses, or other products encompassing (at least a predominant part of) them, e.g.:

An image processing apparatus (101) for analyzing a difference of at least two gradings of an image comprising:

an first input (120) for input of a first graded picture (LDR) with a first luminance dynamic range;

a second input (121) for input of data encoding a grading of a second graded picture (HDR) with a second luminance dynamic range, different from the first luminance dynamic range;

a comparison unit (110) arranged to determine a grading difference data structure (DATGRAD) on the basis of at least the data encoding the grading of the second graded picture (HDR).

As above with the methods, the grading difference data structure (DATGRAD) structure may be as simple as a list of regions where there is different grading (e.g. all blocks), and preferably also a mathematic representation of the difference, e.g. a pixel offset, or correction model for at least some of the pixels in the block, typically compared to some standard mapping relating the two gradings (e.g. an algorithm mapping the two with a gamma function, of which the gamma coefficient(s) may be transmitted e.g. per shot of pictures; in case of several coefficients there may be e.g. a power p, a gain g (or peak brightness), and an offset off: $HDR=(g*LDR)^p+off$).

An image processing apparatus (101), in which the second input is arranged to receive a second graded picture (HDR), and the comparison unit (110) is arranged to determine the grading difference data structure (DATGRAD) based on comparing pixel values of the first graded picture (LDR) with pixel values of the second graded picture (HDR) of at least a spatial or luminance region of one of the first graded picture (LDR) and the second graded picture (HDR). The comparison is typical after some standard mapping bringing the two closer together into some common comparable form, which can be realized e.g. via an intermediate color space and luminance range, or directly by applying a pre-transform before doing e.g. a weigthed difference, or more smart identification of what the difference actually is (e.g. magnitude, profile over neighboring pixels or subregions, etc.)

An image processing apparatus (101) further comprising an image derivation unit (112) arranged to derive a third graded picture (MDR) on the basis of the grading difference data structure (DATGRAD).

An image processing apparatus (101) arranged to apply an image processing transformation to the first graded picture (LDR) on the basis of at least the data encoding the grading of the second graded picture (HDR).

An image processing apparatus (101) comprising a decoder arranged to decode encoded image data and obtain therefrom a first graded picture (LDR) and a second graded picture (HDR), and the image derivation unit (112) being arranged to apply an image processing transformation on at least one of the first graded picture (LDR) and a second graded picture (HDR) to obtain the third graded picture (MDR) with a similar grading as the first graded picture (LDR) but being of a better visual quality than the first graded picture (LDR).

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings:

FIG. 8 schematically illustrates how to make comparison behavior for grades dependent on extraneous parameters, such as e.g. display capabilities.

DETAILED DESCRIPTION OF THE DRAWINGS

Figure 1:
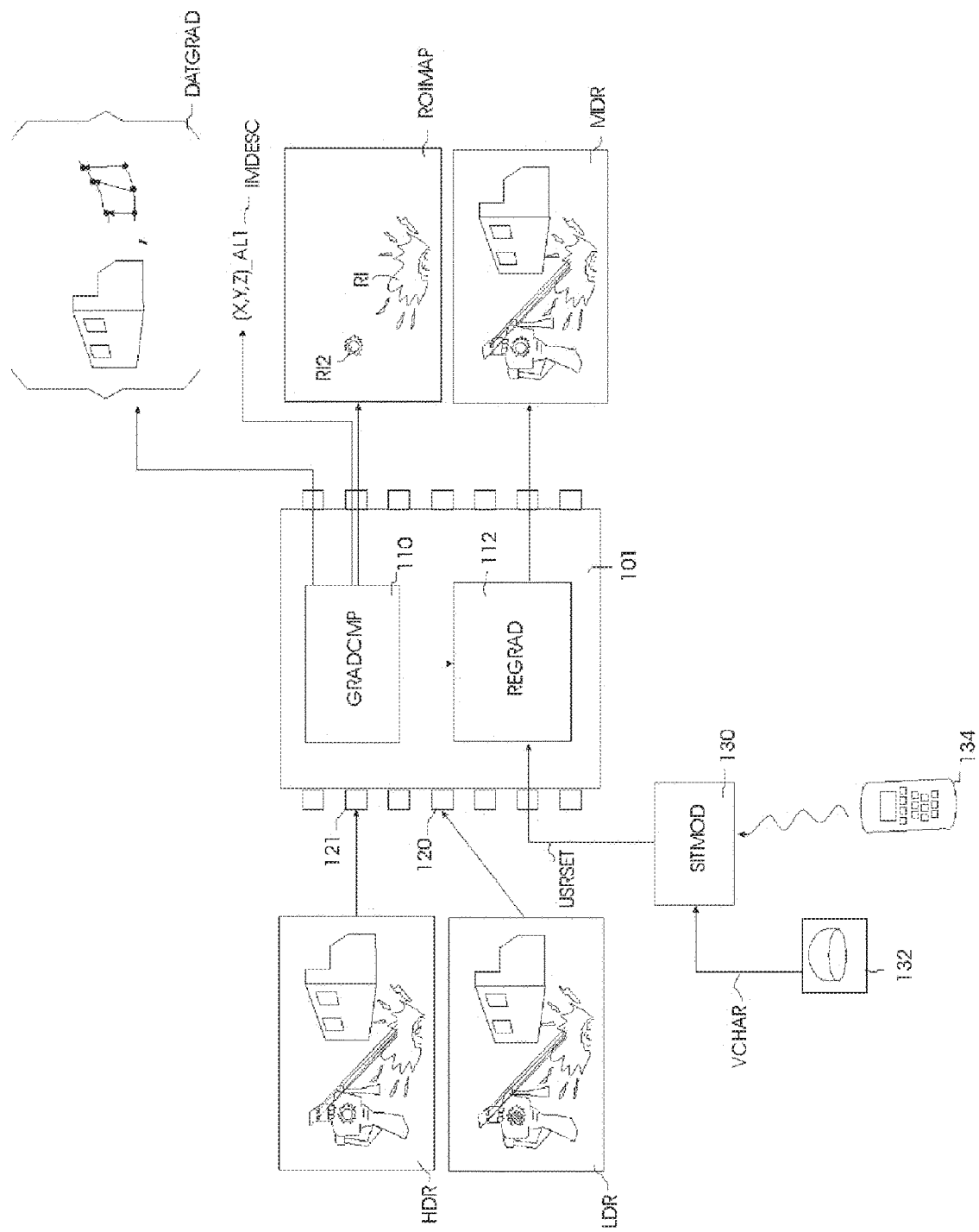
FIG. 1 schematically illustrates an embodiment of a basic comparison apparatus for analyzing two grades (LDR, HDR), as it will typically reside in an encoder, arranged to encode this difference, as a metadata data structure (e.g. comprising ROIMAP, or in general some DATGRAD), which metadata may be accompanying graded pictures, e.g. LDR, HDR, and possibly MDR.
Figure 6:
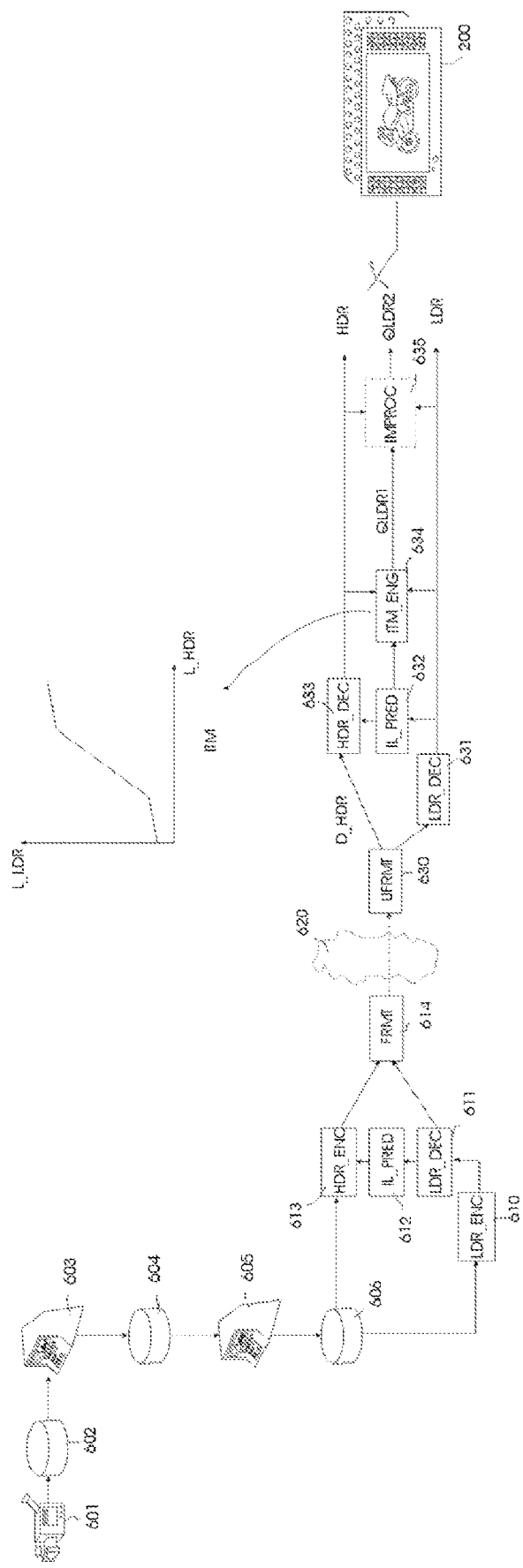
FIG. 6 schematically illustrates an exemplary imaging chain from content creation to content usage, illustrating some of the possibilities with certain embodiments of the invention, like e.g. deriving an improved quality LDR picture QLDR2 taking into account at least some of the information in the HDR grade and/or DATGRAD.

The image processing apparatus in FIG. 1 has two data inputs, namely a first (e.g. for simplicity of the below description called low dynamic range LDR) input 120, and a second (typically high dynamic range HDR) input 121. These inputs may e.g. receive pictures, which may have been encoded according to a compression standard (e.g. DCT based like AVC) as explained in FIG. 6, but for the moment we assume for simplicity that they are plain RAW pictures with an N-bit value (with three or more color components being encoded as M-bit values, but for this application we will for simplicity of the explanation treat the pictures as if they were grey value only pictures). We will make the distinction in this text between the term "image", which is the geometric composition of pixelized objects as e.g. captured by a camera (or generated in a computer graphics environment), and the term "picture", which is one of the many possible encodings, and in particular gradings of that image (i.e. the image is kind of the father of a family of pictures, and it may e.g. be a camera raw file, whereas a first picture derived therefrom may be an 8-bit linear encoding, and a further picture derived therefrom may be an 8-bit non-linear encoding with a gamma 0.45). We need to explain the difference between a grading and an encoding (we will use the general word "encoding" for any specification in numbers of the color of a pixel or a picture, and "compression" if there is also a mathematical transformation for reducing the amount of required encoding bits involved [to avoid re-use of the word compression, we will use the word "downconverting" when compressing values in a larger dynamic range into a smaller one, e.g. by multiplying them with a fraction such as 0.5, or any other mapping function]). With grading we mean how the luminances (/colors) of all image objects are coordinated in a picture, which may e.g. be encoded as RAW. And typically for creating different optimal looks (e.g. for different displays), one will create different gradings. I.e. grading has to do with the allocation of objects of a captured scene to specific luminance ranges of the final picture encoding, based on aesthetic principles (making the picture look better, then e.g. with a mere blind camera capture). I.e. gradings typically involve some human component (of course with new optimized technology), although this may also be embodied in applying some final mathematical transform (e.g. the grading may be encoded as an optimal gray value allocation function, based on a priori aesthetic concens). To make sure this isn't interpreted as just an encoding of mere artistic non-patentable concepts, we would like to strongly emphasize that the present methods allow the technical constuction of new systems, namely in particular systems in which it is possible to have the hardware determine autonomously new best, aesthetic looks. The gradings then ultimately when encoded form technical information required for the technology, just as a captured image may be constructed artistically by creating a nice looking scene with e.g. furniture, but ultimately forms technical input into e.g. a sharpening filter. An LDR picture incoming on the LDR input may e.g. be 8 bit encoded, and an HDR picture e.g. 14 bit, but the number of bits by itself says not so much about what exactly is in the pictures, more precisely, which color each of the pixels of the image objects has. E.g., if a camera produces 16 bit raw, it may be smart to encode those with a faint non-linearity in the 14 bits HDR picture (one may use therefore the fact that the human visual system is less sensitive for luminance differences for higher luminances, i.e. that subrange of the range of luminances may be allocated a lesser than linear fraction of the available 14 bits). However, the 8 bit word may be too small to faithfully encode the 16 bit luminances, whatever smooth non-linearity one chooses, so typically there one determines an intermediate range with needs to be encoded with high precision, and (soft)clips the bright and dark luminance subrange above and below that. Note that this is a choice of range versus precision. Of course one could just linearly downconvert the 16 bits to 8 bits (e.g. by dropping the lower 8 bits), but then important luminance ranges of the image would be badly reproduced, which could lead to banding upon display. So a HDR signal is not necessarily saying much about the amount of bits used for encoding it, but more about which object luminances are in the picture, e.g. there may be very bright regions encoded, and simultaneously very dark regions. It is important to understand that these encodings are typically technical transformations. And one may encode one representation into another mathematically, so also e.g. LDR and HDR to a common format to compare them (e.g. a simplistic one would be to equate their whites with the same 32 bit white level, and then the other colors follow). Even though a cameraman (or the technical person which sets the configurations on the camera) may actually select one of a number of transformation curves according to his preference, this is essentially still a technical mapping with e.g. a gamma 0.45 curve, or as in consumer cameras an S-curve. A grading is usually a finer determination of the pixel grey values and/or colors, and may typically involve an artistic transformation. It may be partially constrained by technical considerations (e.g. the grader may need to apply some kind of S-curve to downconvert to the 8-bit representation, but still he uses artistically optimal choices then, be it only e.g. chosing among different shapes of curve), but typically it involves more complex desirable transformations, like selecting a spatial region of the image, and changing its lightness according to some profile (as if another light fell onto the region which conveys another emotion to the shot), even for the higher bit encodings (e.g. this is typically done for a digital master of a movie or in a higher bit representation rendering space for a game). E.g., the grader may increase local luminances of a region, to make a specularly reflecting object sparkle more (compared to its image environment). This grading is a very useful source of information, since it implicitly contains semantic information about the scene, i.e. what the creator meant to achieve colorimetrically with all the objects or regions. If one has only one picture available (e.g. an LDR grading), the best thing an image processing apparatus can do (e.g. the picture may be defined for a standard 500 nit LDR display, but needs to be displayed at a receiving side on a 1000 nit display, and one really wants to exploit this display's higher luminance range, which will not happen to a great extent when merely applying the picture signal as is to the display, because the luminance stretch originating from mapping the 8-bit white to the 1000 nit display white, is quickly counteracted by the adaptation of the human eye), is to try to transform the colors of certain image pixels, regions, or objects according to very generic technical equations, which may be performed e.g. by an image processing IC in a television. E.g., one can detect pixels with a driving level d_norm (which will typically be the luma component of a color encoding) above 250 and interpret that these are likely highlights, and then strongly boost them so that they map to the white of the current display (leaving other colors at a much lower display output luminance L_out). But this strategy may go very wrong on some images, e.g. one can imagine boosting the white of some person's eyes too extremely. However, if one has at least two different gradings available, e.g. an LDR and a HDR grading, one can better derive from those what any rendering or transformation should be (in the above example, the eyes will not be significantly brighter in the HDR grading, and hence they should be "protected" to behave similarly in all derived gradings, but the lights will be).

A comparison unit 110 looks at the differences in grey value (we may use grey value interchangeably with different related parameters such as lightness, luma or luminance, where no higher terminology precision is needed) of pixels or regions in the first versus the second grading (e.g. LDR and HDR, or HDR and SLDR, a grading for a range below LDR, e.g. 40:1), and characterizes those differences in grey value as a grading difference data structure DATGRAD. As mentioned, the difference can be determined in a purely mathematical picture characterization manner, i.e. by calculating some difference of pixel color or luminance values after a transformation to a common reference (e.g. by emulating the LDR display in a standard way in a HDR color range). This may be done on a pixel by pixel basis, or more smart chacterizations of regions or objects may be used, e.g employing texture measures, or spatial profiles (which may be used for local illumination comparison), etc. However, apart from a pure technical analysis of the pictures, it may be advantageous to define a difference algorithm taking into account psychovisual laws, to determine what the actual difference is. With this we don't just mean calculating in e.g. an Lab space or applying color appearance models, but it is known that the human visual system judges lightnesses of objects compared to what is in the surround. In particular, the human visual system judges psychological black, white, and greys in a totality of what is seen (such as how bright a display can render pixels, but also the surround colors). The latter is especially important for HDR, since the human visual system will make a cognitive difference between whitish reflective colors, and self-luminous lamps in the pictures. The rendering should preferably not be so that e.g. a clearly to be seen as white region, is seen as a light grey region, or vice versa. Such models can also be taken into account in some difference calculations, i.e. in general the difference in grading per pixel or geometrical locus need not be a single real number, but can be a tuple characterizing several aspects of how e.g. a local object differs in grading (i.e., e.g. an image encoded with e.g. 6-dimensional tuples per pixel, like a color difference, and a 3-dimensional lightness difference per pixel; but differences can also be encoded as more complex models, e.g. transformation functions, or parametric N-dimensional mapping manifolds which are equivalent of an image having as tuple values the function values, etc.; note that the image may also be e.g. a spatial-statistical representation of the actual scene, e.g. a multiscale coarse representation of object recolored according to certain functions based on an object's class type such as a brightness subrange, etc.). This tuple may contain several image properties, since it is known that also e.g. local sharpness is relevant to the final look (the human visual system mixing all this together), hence it may be used at the receiving side to determine a different third grading, e.g. de-emphasizing some local contrast in favor of increased sharpness. Differences may also be encoded as vectors, models (e.g. a functional mapping relating, or mapping the two), etc.

The grading difference data structure DATGRAD can run over the differences for the entire image (although in a running analysis algorithm, it need not contain stored information of all image regions at the same time), or important parts of the image. Of course grading difference data structures DATGRAD for a number of pictures (e.g. three gradings of an image) or a number of images (e.g. a comparison of the grading of an LDR picture at time TR+5 with the same HDR object in a reference image at time TR) may be constructed etc., which can convey in several ways how certain constituents of scenes, such as scene objects, should look under various particular rendering side limitations (such as display dynamic range, a change of environmental lighting, etc.). A simple embodiment of the latter type of variability may be e.g. a regions of interest map ROIMAP (e.g. a picture with the size of the image). FIG. 1 schematically shows such a map as containing two regions of interest, namely RI being an explosion, and RI2 being a bright light on the chest of a robot. These regions can be indentified because there is a major difference in grading in the two pictures, e.g. the LDR picture needed to clip the values to 255, and the HDR picture specifies them as bright values well above the values of the rest of the scene. Several mathematical algorithms can be used to determine this difference, which may result in a boolean number being written in the regions of interest map ROIMAP ("1"=interesting region, "0"=uninteresting), or the algorithm may further qualify the difference (amount, or type, etc.) with e.g. an 8 bit number, e.g. further characterizing how much brighter a region is than in the LDR picture (e.g. if CR is the grey value of a pixel in the map ROIMAP, the used definition may be $0<=CI<100$: normal, not interesting; $<100<CI<150$: bright object of first brightness type; $150<CI$: very bright object, which should be rendered with the maximum brightness available at the display side), or with image content analysis defining which kind of object it likely is (leading to other rendering processing transformations), etc.

I.e. the difference needn't be encoded precise, but can be roughly allocated to some classes (allowing rendering variability at the receiving side), and further metadata may be added to the DATGRAD structure, e.g. further characterizing the kind of region (it may contain a flag that this is a "brighlight", which may be a simple binary characterization [reflective objects may be considered equal in both pictures/ gradings, although their actual pixel values—even after transformation to a common reference with a standardized mapping—may be different, whereas lights are seen as different, and are to be rendered fundamentally different on an LDR versus HDR display]). E.g., one can compare the value of a simple prediction (e.g. a linear stretch of the LDR image, or expected re-rendering of it given the better characteristics of an intended HDR display) with the actual value of a pixel in the HDR image. If the predicted and actual value are approximately the same, it is probably not an interesting object, but merely a conversion to show the region in a similar way on the higher dynamic range system (which can be converted to a "0" indicating equality, e.g. by coarse rounding). On the other hand, if the values differ to a greater extent, the pixel may be marked as interesting ("1"), a rough characterization of "different". The comparison unit 110 may also use equations looking at the ratios of pixel values in the LDR and HDR picture, in particular if the surrounding pixel's ratios are also taken into account (e.g. the grading grey value relationship changes from a first one outside the interesting region RI, to a second relationship inisde RI). Comparisons need not be based on per-pixel analysis, but further pre- or post-processing may be involved, such as spatial filtering, morphological processing, removal of small erroneous structures, etc. Also can some regions be discounted and not included in the ROIMAP— e.g. by further analysis—e.g. a region which corresponds to the sky, or depending on size, shape, color, texture, etc of the identified regions.

Having these regions of interest RI, makes them useful for all kinds of image processing. This may be image processing relating to the rendering of the image, e.g. a new picture may be constructed (e.g. by transforming the LDR or HDR picture as inputted) to be applied as driving values for a display, in which bright values of bright objects are made even more bright (e.g. corresponding to a user setting of "amount of highlight boost"). However, other image processing functions may also benefit from the regions of interest RI. Since the regions were important enough to merit different gradings, they should remain in an image processing like e.g. a crop to go to a different aspect ratio (e.g. for a small display 281 on a portable device 280). Furthermore, the chest light of the robot may form an initial input for further processing the region with image analysis methods, e.g. humanoid-shape detectors. Also, in an image compression and image decompression strategy, the (de) compression mathematics may be tuned differently for such regions, e.g. the precision of quantization, or other quality influencing parameters. It is then easy to allocate such e.g. quantization step values which may be allocated to the image signal as metadata (comprised or separate) to pixel values in the ROIMAP. Also, the explosion region may be processed with a different image processing algorithm (including computer graphics algorithms), e.g. one which emphasizes or improves the texture of the flames or dust structure in it. Analysis of these regions of interest may be used in applications which benefit from (especially simple) descriptions of the image IMDESC. E.g. the generation of ambilight or surround lighting effects benefits from better knowing the objects in the scene, in particular regions which are real light structures in the image (and in particular when they are faithfully represented, such as in an HDR grading). One can derive e.g. an (X,Y,Z) or (L,a,b) or (R,G,B) average color (or set of colors) for the explosion region, and use only this region/color for the driving of the ambilight ((X,Y,Z)_AL1 may be a control parameter, or direct driving of the ambilight via a connection 260 to an ambilight unit 261). The second region of interest can be used to drive surround lighting (according to a characterizing surround lighting control parameter (X,Y,Z)_SL1 send e.g. wirelessly to a communication unit 251 of any of a set of surround lights 250). In general, the image description may be based on all kinds of properties of the available pictures and further data, e.g. whether the object is computer graphics generated, etc.

If one wants to derive a newly graded picture, e.g. for a different display, different viewing environment characteristics, different user preferences, etc., the comparison unit 110 will typically analyse the entire picture (since it will generate a new pixel for each of all pixels in the other graded pictures, and this will then correspond to an image-based estimate of how scenes should in general look under different rendering situations, given the two example gradings), but of course pictures of more images may be involved (e.g. a particular (earlier) image may be marked as having a particularly representative grading for the shot or scene, or selected because it contains graded dark objects not present in the current image to be re-rendered, or other reference picture). The re-rendering transformation may then employ this additional information when determining the change in grey value e.g. starting from the HDR picture for lighter objects which are present in the current image. This may be useful e.g. to adjust the rendering to reserve gamut or take into account several effects.

The grading difference data structure will then at least comprise one (or several) pixel values in both graded pictures for at least a selected region of pixels in the image. Several equivalent structures may be employed, from a complex one summarizing the entire image, or a statistical summarization thereof, to a simple local representation (e.g. in analysis algorithms which run over small parts of the image at a time, in which case the rest of the image may still be summarized in further data.

Figure 3:
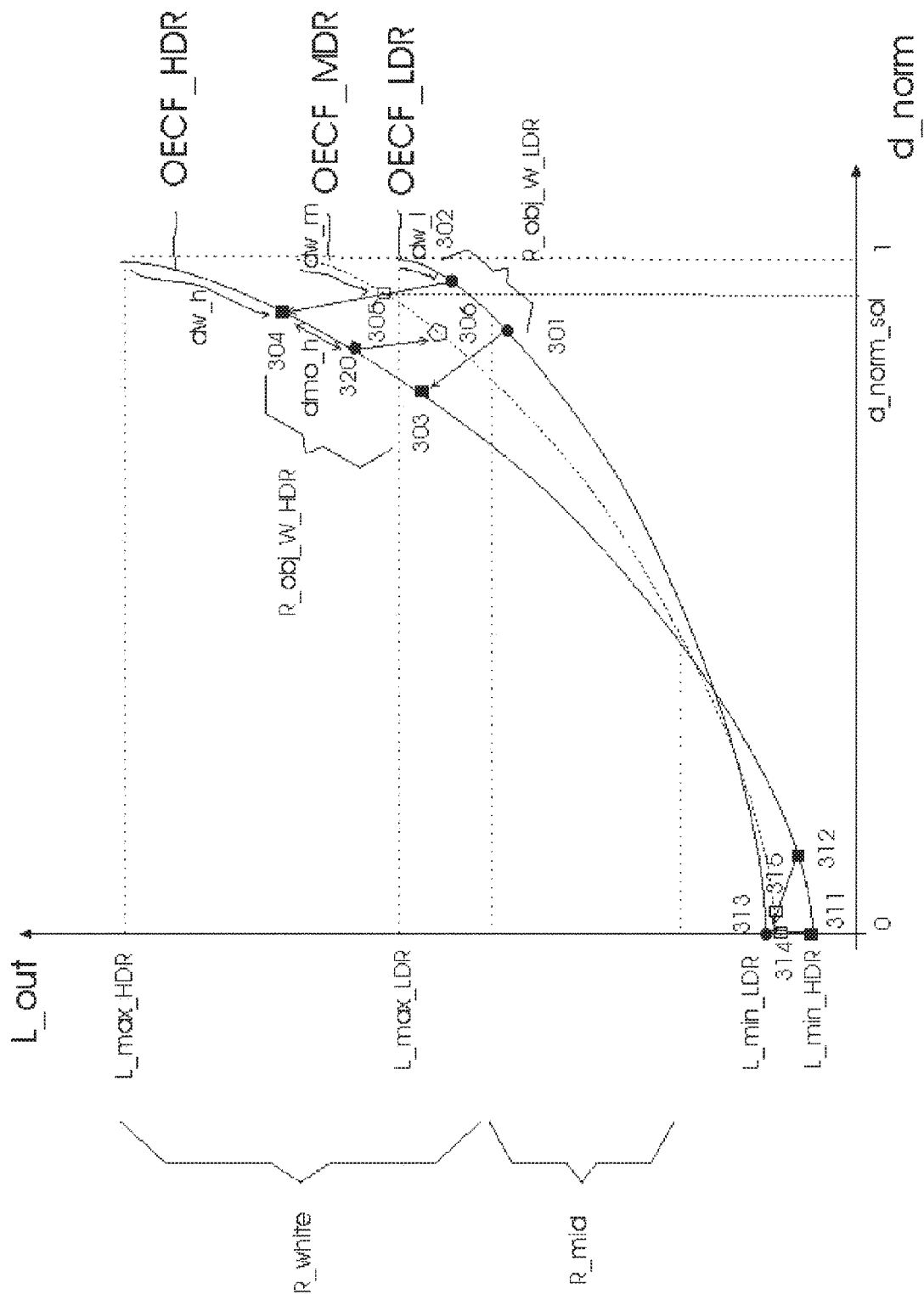
FIG. 3 schematically illustrates how one may derive an intermediate grading based on average behavior of two other gradings.

As an example we will use FIG. 3 to show how to calculate a grading for an MDR (medium dynamic range) display intermediate between an LDR display (e.g. intended for classical L_max_LDR=500 nit 8 bit displays) and a HDR display (e.g. for a reference display of L_Max_HDR=5000 nit, according to which the HDR encoding was done), e.g. a HDR display of lesser quality only able of outputting 2000 nit white, solely on the basis of the available LDR and HDR gradings. The actual derivation of an MDR grading (and therefrom an MDR display driving signal, however in the example of FIG. 3 we immediately derive the driving signal d_norm) is done by a regrading unit 112, or method. The skilled person should understand that with similar considerations, similar versions of the comparison unit or method, and regrading unit or method may be built using in addition or solely other data encoding the grading of the second graded picture. E.g., if in an encoding the HDR picture is encoded predominantly based on a tone mapping IL_PRED from the LDR graded picture, then an inverse of that tone mapping may be a useful function (i.e. the skilled person can construct regradings similar to the below examples, not merely by tuning the regradings by the additional data—e.g. if the inverse tone mapping corresponds to a diminution of the grey value of particular objects to a certain extent, the regrading for MDR may do so to a lessened extent—but also by using these a sole data for deriving the regrading functions).

In FIG. 3 two opto-electronic conversions functions are shown, OECF_LDR of an LDR display, and OEFC_HDR of a HDR display (e.g. the 5000 nit reference display). They are shown with an analog normalized x-axis (so that the amount of bits encoding the LDR resp. HDR graded pictures they correspond to is irrelevant, since both e.g. 8 bit and 14 bit will map to 1), and the y-axis shows if one applies the x-value d_norm as a display driving value, the display outputs a luminance equal to the curve's L_out value. Typically such curves are gamma functions, further taking into account further compensations for typical or actual glare etc. The comparison focuses on at least one or some points on the curve, e.g. a region of pixel colors, which have whitish grey values and correspond to driving value range R_obj_W_LDR in the LDR grading, and R_obj_W_HDR in the HDR grading. Note that in this simple scenario which focuses mainly on how a display can display grey values by its electro-optical behavior (i.e. the pixel values are interpreted in a display-gamma view), the grading can be interpreted as a shift along the OECF, i.e. the range in LDR has a smaller distance dw_1 from LDR maximum than the distance dw_h from the maximum of the HDR picture. This can be because the grader considered the object to be too bright, if it were to be rendered with e.g. a mere linear stretch of the LDR values onto the HDR range, i.e. he corrected the driving values for those pixels in the HDR picture to be lower than the plain stretch values (note that plain stretch values to LDR and HDR may originate from e.g. naively mapping camera raw values). In this object range, particular pixels in the LDR image (e.g. pixel 301, or 302 having a certain grey value as seen on the graph) correspond (e.g. simply by geometric collocation, or with more complex assignment algorithms) to particular pixels 303 resp. 304 in the HDR image. One would like to know what driving value one needs (for pixel 305) on an intermediate MDR display, given the "optimal" graded pixels for LDR resp. HDR (302 resp. 304). Advantageously, with a simple algorithm, for interpolation gradings, this point 305 can be obtained by determining the OECF_MDR for that MDR display, and calculating the point of intersection of this OECF_MDR and the line connecting the points 302 and 304 in the LDR resp. HDR grading. Therefrom the driving value d_norm_sol for driving the MDR display can be determined. Applying this OECF_MDR has many advantages leading to a good solution. E.g., if the output luminance is to be the same for all displays, the horizontal connecting line will yield for any OECF a driving value yielding that output luminance. Conversely, there may be scenarios were multiple points on one OECF correspond to a single point on the other OECF, because of clipping. E.g., in the dark region, OECF_MDR and OECF_LDR are locally relatively similar. This similarity will result from the mapping algorithm, since the difference in rendering between two dark pixels 311 and 312 nicely scales according to the display's capabilities to ever increasingly different points 314 and 315 the more the OECF_MDR becomes similar to OECF_HDR. Of course more complex algorithms can be used, more closely looking at the positioning of points or set of points along the various OECF's, and in particular looking at expected positions as well compared to reference points exterior to the object range/region as compared to interior references (having to do respectively how the grader judges the impact for various grading scenarios of global lightness relationships, versus object-internal contrasts). E.g., as a more complex mapping to point 306, the mapping equations may comprise evaluating relationships of where a point lies within a typical range of object points (e.g. distance dmo_h from the lightest point 304) versus where the range is compared to e.g. the maximum (dw_h), and this for the predicted MDR graded pixel values (distance dw_m should be conforming what is expectable given the two other gradings, at least within a tolerance, so e.g. one may shift a little more excessively towards darker values than would linearly be expected given dw_h and dw_1, but not darker than dw_1), versus the relationships in the different gradings (LDR, HDR, and possibly further gradings, for other displays, or other display scenarios, etc.). Mapping equations may also contain characteristic values, such as e.g. an average or often occuring color in the object range under processing, and these values may even be co-stored as metadata with the encoded images, e.g. on the basis of statistically analyzing the grading process at the grading side (e.g. one can look at the grader carefully fiddling with values trying to optimally fit them in an upper part of an allowable range for a certain object or kinds of objects, looking at such parameters like amount of time spent on that grading etc., which may guide the re-grading into mapping in a corresponding subrange of the MDR display OECF). Examples of useful data for finetuning the regradings are e.g. a range of bright colors R_white, which may be to different degrees relatively well representable on higher dynamic range displays versus less so on lower range displays, versus other scenarios for comparing and regrading objects or regions on intermediate ranges like R_mid, which is/sohuld be well represented even on many LDR displays or below.

Figure 4:
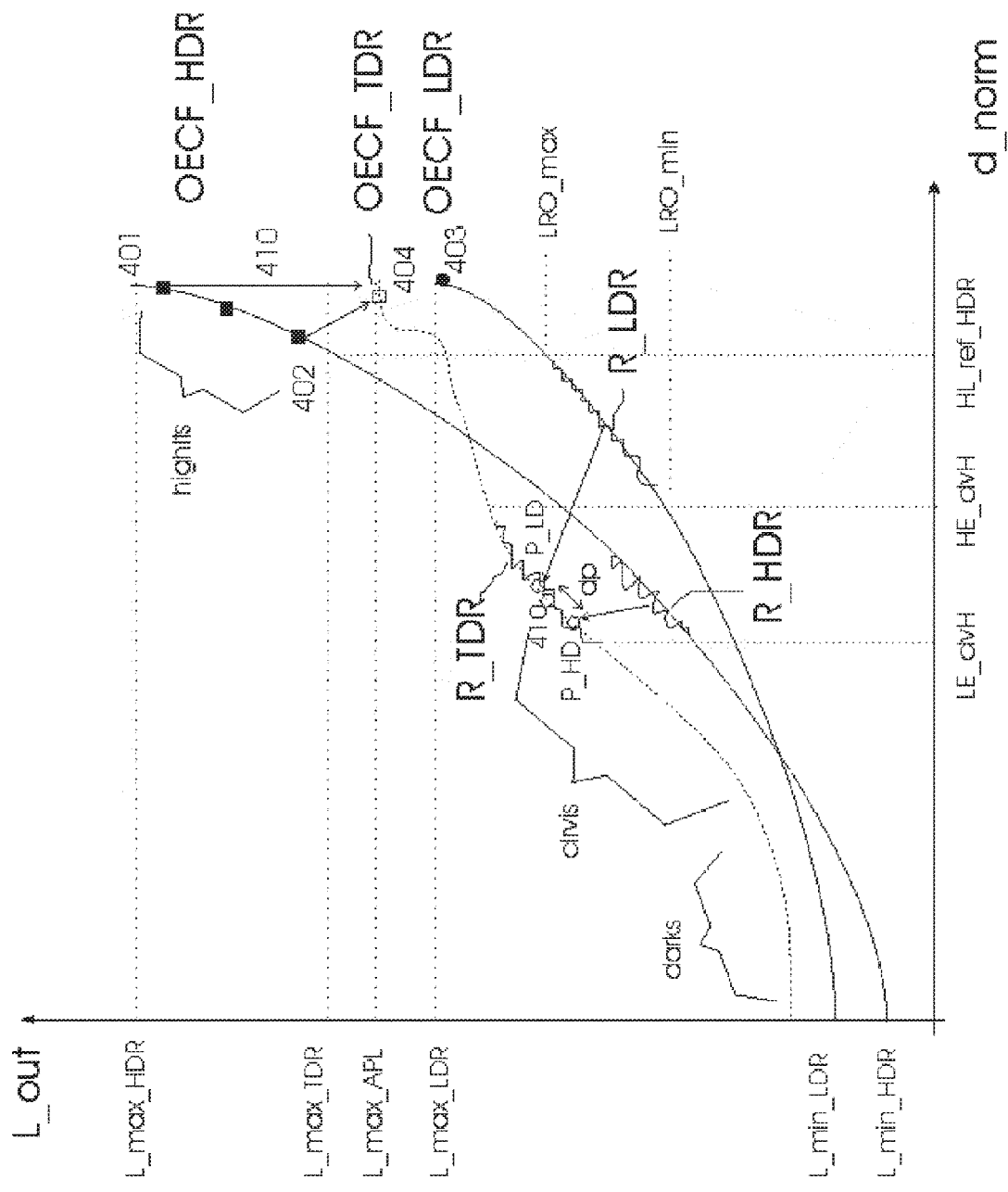
FIG. 4 schematically illustrates another example of how one may derive a third grading based on information present in two other gradings.

An example of a more complex grading, which may be useful for extrapolating towards e.g. sub-LDR displays (such as e.g. the lower quality display 281 of a portable device 280, which may even need to be optimally driven to account for higher glare i.e. reduced contrast), as well as tuning for other desires like e.g. user-preferences, is illustrated with FIG. 4.

One should understand that, alternatively to presenting everything in a physical OECF representation, and conceiving all other modifications as shifts along those OECFs, one may also represent several modifications of grey values such as tone mappings (e.g. a user-prefered contrast setting) as modifications of OECFs yielding a total OECF, e.g. OECF_TDR (as if the display didn't have a gamma behavior anymore, but some other complex behavior, or in other words, one re-evaluates the pixel color mappings in some other global (or even more complex, or semi-global) transformation view). Such a OECF_TDR curve can then be seen as a typical rendering system curve instead of a simple display curve. This is particularly interesting for modifications which are "always expectable" (like a user which likes his bright regions always exceptionally bright, however they happen to become graded), and to distinguish from the particular grading of particular objects in particular images/pictures (which artistic intent can then still be represented as shifts). E.g. the grader may prefer that a dark coat shot in the original scene should actually be graded as bright white, and the user wants all bright coats to be even brighter. Whatever the actual OECF of the display may be, the user has configured it (e.g. with additional lookup tables or similar) to have a characteristic OECF_TDR which doesn't care too much about the dark colors (he has added a brightness offset to those, perhaps because the movie has some dark scenes and the user wanted to see them better given the flare of his living room lighting reflecting on the display's front glass), he has specified a large contrast for intermediate colors (in the range clrvis) and he prefers to clip (even if the display may actually render brighter colors up to its maximum L_max_TDR) at least brighter highlights 401, 402 (above value HL ref HDR or a similarly specified parameter, depending on the mathematics behind the user controls, which wants to apply smart color improvements with not too many user-settings) to a single highlight typical value L_max_APL (i.e. those points would be mapped from the HDR grading—by mapping 410 et al.—to point 404).

The creative grader on the content creation side can now have a say on how renderings should (approximately) look when under such variable conditions, such as e.g. a user brightness boost. He may also use partial curves. E.g., above driving value LE_dvH he may use a simple interpolating strategy based on the display gamma behavior as explained above. But for darker colors, he may describe one or several other transformation strategies, e.g. one for maintaining maximal discernable image detail, one for maximal scary (hidden) look, etc. Differences in the HDR (more enabling) grade and the LDR grade may be interpreted in the light of this (e.g. how detail comes to live in gradings of succesively higher dynamic range), and hence prediction functions (symbolized as arrows in FIG. 4), or partial functions like OECF_TDR determining the average system behavior, may characterize the different grading in at least two gradings, and determine the regrading behavior to a third grading. E.g. if a user pushes the brightness button, the system moves towards the or a more detail preserving regrading for the darker colors.

This algorithm uses expectable transformations for initial predictions, and then corrects based on the actual graded pixel values in the several graded pictures LDR, HDR. E.g., a grading may be constructed with typical reference values for viewing surround. One could after applying the method of FIG. 3, apply standard colorimetric transformations based on human psychovisual principles for thereafter e.g. increasing the contrast of the picture when it is viewed in a darker environment than prescribed for the e.g. LDR encoding (i.e. the LDR signal is to be modified for use on an LDR display, but in a significantly darker environment). But that may be suboptimal, at least according to the grader's artistic preferences. Alternatively, one could incorporate these factors (required increased contrast at least over a range of the driving values) directly in the prediction model from the available gradings. This could be both done if some of the gradings (partially) convey precise information on how the grading should be for a decrease in viewing environment luminance (e.g. the grader may for a couple of representative pictures regrade to e.g. a second LDR and HDR grading for dark surround), which information may then be used to increase the accuracy of mappings for other images/objects/scenarios, but even with only two simple gradings LDR and HDR, the FIG. 4 strategy makes sense. In this exemplary method, one considers a range of pixel colors in the LDR, and predicts where at least a point therein (e.g. the midpoint) should fall on the target tone mapping OECF_TDR, namely on point P_LD (this mapping is done by creating functions which take into account all or some of the required psycho-visual corrections characterizing the user's adaptation to the new viewing environment, his preferences regarding contrast, etc.). Doing the same with the HDR (i.e. tat subrange or object region in the HDR grading) yields P_HD, which is different from P_LD by an offset dp. This may typically be because the grader thought these colors should be rendered with mild lightness on bright HDR displays, whereas e.g. physical constraints may force him to render them with higher driving values for LDR. The final mapping algorithm for obtaining the corresponding point 410 to the midpoint on the OECF_TDR will then determine whether it should be closer to the LDR or HDR prediction, taking such factors into account like: because the user preferred this small subrange to be rendered with high contrast, not so many grey levels can be represented for this range, which may also looking at where the range R_LDR is in the totality of possible grey values, results in the fact that the point 410 should be closer to the LDR prediction P_LD. Of course a blind algorithm with less accurately modeling equations may take as a reasonable approximation the midpoint between P_LD and P_HD, which simplifies calculation load, i.e. a detector may evaluate the difference between P_LD and P_HD and then decide whether more precision and a complex further calculation is required. In the common representation, the range under comparison in this example falls between driving values LE_dvH and HE_dvH. LRO min and LRO_max are examples characterizing the LDR subrange on the luminance axis.

Figure 5:
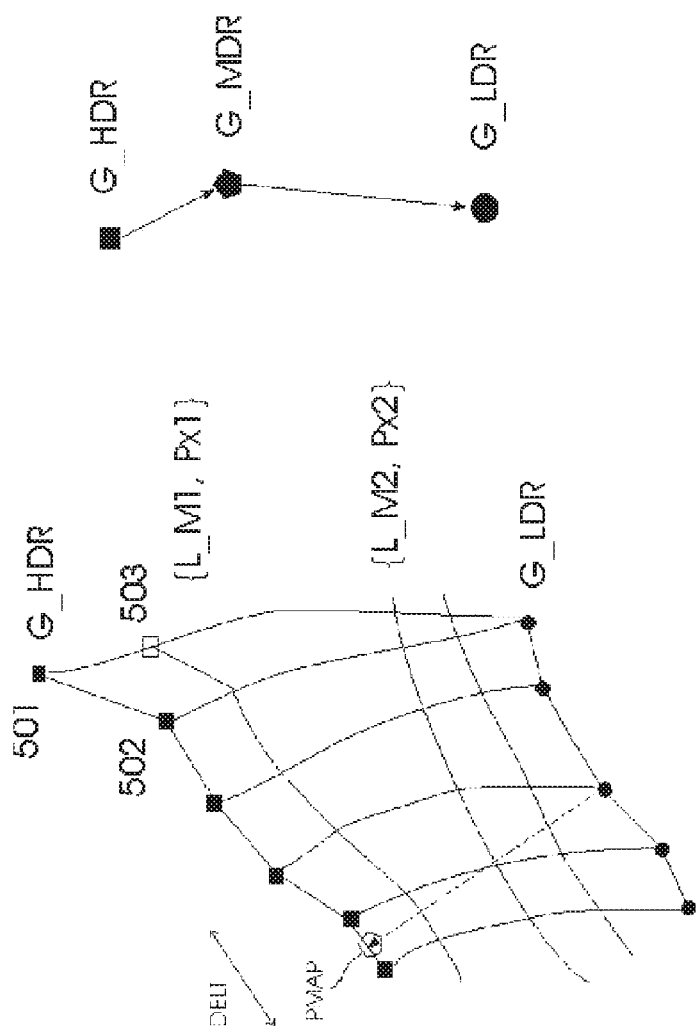
FIG. 5 schematically illustrates another example of how one can relate colors of certain values or classes in two grades, to corresponding colors in other grades derivable therefrom.

Such models may represent the complexities as illustrated with FIG. 5. E.g. in FIG. 5b a (perhaps local, i.e. only for some regions or objects) further actual grading is present, and the corresponding point G_MDR shows that more accurate interpolation should be done not according to linear trajectories, but rather nonlinear trajectories (this may stem from the fact that close to the HDR grading, intermediate gradings of that color should not differ too much, but above a certain distance from HDR, they quickly converge to the LDR situation. This may be e.g. because of the grader's choices to squeeze everything possible out of any higher dynamic range display for those colors. Such considerations can be mathematically handled with equations containing e.g. a distance along a linear prediction between the LDR and HDR points, and an orthogonal deviation therefrom. FIG. 5a shows an example of a construction of a more complex grading difference data structure DATGRAD with locally for that image complex non-linear behavior for intermediate gradings, e.g. the point 503 on a grading being accurate for a display with maximum value L_M1, and possibly further parameters Px_1 like minimum value, etc. A mapping according to a parametric mathematical prediction PMAP may deviate by a curvilinear distance DELT from the actual optimally graded point, so the more of this points are available, the better the prediction may become. Those points and curves may be estimated based on little data (like only the LDR and HDR grading, and further colorimetric parameters) on the receiving side, but they may also be determined on the basis of co-encoded data from the sending side (e.g. the software of the grader's apparatus may have added some highly representative curves, or parameters to (more accurately) regenerate those.

Returning to FIG. 1, some optional connected components are shown. A situation analysis module 130 provides parameters regarding a situation requiring other re-rendering, e.g. different mapping algorithms, or another target tone mapping OECF_TDR (which may be determined by the regrading unit 112 on the basis of conveyed data, or by the situation analysis module itself and transferred), etc. It may be connected to various devices such as e.g. one or more environment measurement devices 132 (which may be e.g. an illuminance meter measuring the brightness of the living room or surround in which the display resides, and transfers this information as environment characterizing data VCHAR). The image processing apparatus 101, whether at a creator's side, or at a receiving side such as in a computer or settopbox, may also be connected to a user controller 134 (e.g. a remote control). In this way regradings can be determined based on certain user preferences. E.g., a user may have several visual quality settings available, simple global contrast boost as with classical television, or a more HDR-related control which with e.g. three parameters set: a brightness setting for the darker colors, a contrast for the mid_range, and a preferred boost or dimming for the brightest colors (from which the algorithms then can construct or modify tone mapping functions). Then the user controlled settings USRSET may be three numerical values e.g. Further smart settings may be incorporated into the television, content player, etc., e.g. a global power saving setting, which does more to the tone mapping than just scaling the maximum output, but applies a smart curve also taking into account optimal visibility of important mid_range objects (possibly taking into account viewing environment data). Another setting may work only on the brightest colors, e.g. to increase or reduce their impact or annoyance.

Figure 2:
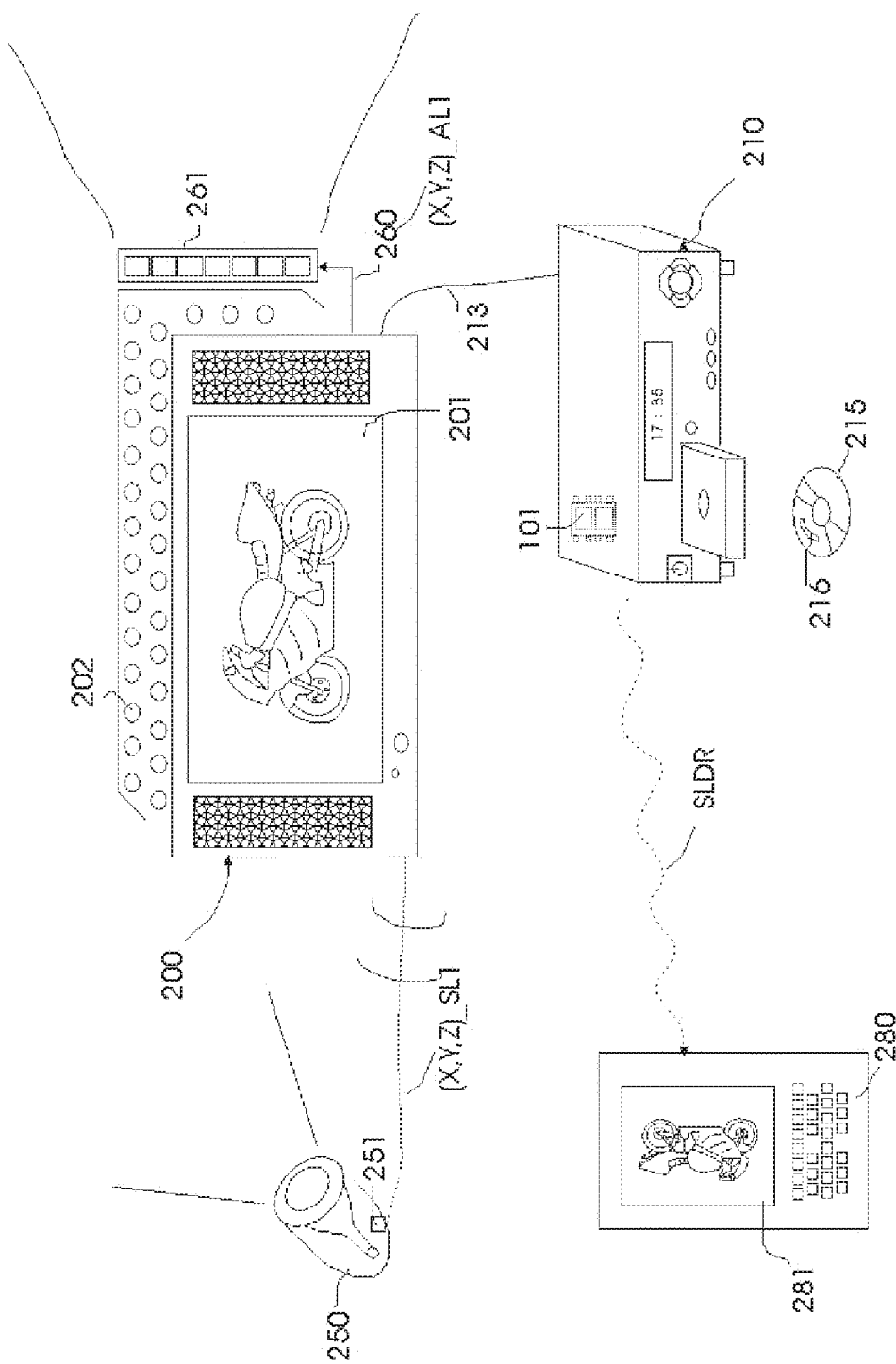
FIG. 2 schematically illustrates an exemplary receiving side consumer system, in which several apparatuses can use the present embodiments to optimally derive gradings and driving signals for optimally rendering the scene as intended by the graders, on their respective displays.

FIG. 2 shows an exemplary living room system which may employ and benefit from the present embodiments. E.g. the image processing apparatus may be realized as an image processing IC 101 in an optical disk player 210 (e.g. BD, but note that this is only exemplary as the invention may be realized with other memory means like e.g. a solid state memory, or data transmission paths, like an internet connection etc., and of course the image processing "apparatus" may be any large apparatus also). A bluray disk 215 may contain the two graded pictures (or information equivalent thereto), and also further data 216 regarding how pictures should be graded and/or rendered (e.g. explicitly specified by the grader for specific objects, or automatically derived from the grading exercise), and potentially other information, such as how gradings should be mapped to compression parameters, etc. The latter may be sent via additional tracks, or metadata, e.g. systems like supplemental enhancement information in AVC. E.g., the grading apparatus at the graders side (e.g. 603) may track the amount of time a grader is pre-occupied with the grading of several objects. This is an indication of how important an object likely is, and it can be represented numerically in e.g. the region of interest map ROIMAP. Automatic image processing algorithms at the receiving side can then take this information into account, e.g. they can make sure the object is optimally visual on a low quality display. Also parametric models aiding to recreate structures like in FIG. 5a may be stored. Note that there may be metadata to enable the regrading to different kinds of grading, which may form approximate templates allowing more precise finetuning, e.g. how at least the most important objects should be mapped from LDR to SLDR, how LDR should map to LDR* under other expected viewing conditions, and one likely intermediate grading. The grader may specify even more precisely (at least for some critical objects) how for a larger number in a range of different displays the effect should be accurately regraded. As semantic information may be co-stored which type of image object or effect etc. it concerns, e.g. a flash-light which should shine brightly towards the viewer, or an explosion which should temporarily dazzle him, etc. Note that although we mentioned a consumer BD disk, this may also be a storage device for permanent storage of the grading at a content owner's side, or a transmission means for transmitting to a television studio, etc. Similarly, although we described the regradings in a consumer environment, they may also be performed in a professional environment, e.g. as automatic pre-grading before a human correction. Although also a display itself may contain the image processing IC, in this example we assume the BD player (or it could also be a settopbox, or PC, or home media device etc.) does the grading analysis, and regrading. It may connect to a television 200 over a wireless or wired connection 213 (e.g. HDMI), which may either convey the required graded picture (e.g. the MDR picture), or other data to allow the television to do (first or further) regradings, image processing functions such as sharpness increase or color modification, etc. The television is comprised of an LCD panel 201 and a LED backlight unit 202, and has a separate ambilight unit 261. The BD player may also construct a further grading SLDR to be sent to the portable display 280, which a second user is viewing in his bedroom.

In interesting embodiments, the third grading is also an LDR picture (e.g. QLDR1), i.e. that is typically a picture which looks much like the input LDR grading (i.e. the colors/luminances of its pixels fall within a variance range RANGVAR around the luminances of the input LDR, there being e.g. only sharpness or texture addition/improvement adjustments). Some examples of this are illustrated with FIG. 6, which also shows an image use chain from creation to rendering. A camera 601 stores the camera raw data on a master storage 602, wherefrom it is master graded on a grading apparatus 603, and stored on a digital master storage 604 (this may be equated with the HDR input, although of course further automatic or user-guided transformations may be involved). Later this digital master may be graded again on a second grading apparatus 605 and stored on an LDR storage 606 (e.g. this may be the grading for storing LDR into 8 bit on BD), together with the HDR (e.g. 12 bit log digital master). Then there may be a layered coding involved, in which an LDR compressor 610 compresses the LDR signal according to DCT-based principles like e.g. in AVC. An LDR decompressor 611 reconstructs what a receiving side can do, and a HDR predictor 612 applies a tone mapping to predict the HDR signal from the decompressed LDR signal. A HDR encoder 613 encodes the HDR signal, e.g. as a residual (and/or correction of the tone mapping function(s)). For more details of an exemplary embodiment we refer to EP 10168565.9 (PCT/IB2011/052892). A formatter 614 puts everything together, e.g. on a BD disk, or to be transmitted over network 620. An unformatter 630 unpacks everything at the receiving side, and obtains via LDR decompressor 631 an LDR picture (or picture sequence) and data encoding the HDR graded picture (i.e. e.g. difference pictures) D_HDR. Via a second HDR predictor 632 and an HDR decoder 633, the HDR signal can be faithfully reconstructed. Note that in this layered approach, similarly to the HDR encoder 613, there may be further encoders encoding difference signals on the basis of LDR, and potentially also the other signals like HDR, e.g. for an MDR display, or other viewing environments, etc.

An advantageous application of the present embodiments is the optional inverse tone mapping unit 634. Namely, if the HDR picture (note that the inverse tone mapping function may be derived starting from available versions of the tone mapping from LDR to HDR, but it can of course also be (co)derived by analyzing the HDR and LDR pictures) relates to the LDR via a tone mapping, then the LDR is derivable from the HDR via its inverse (ITM, relating all luminances L_HDR of the HDR picture to L_LDR luminances; note that in view of the complex gradings, such tone mapping need not be fixed for an entire image, but may be spatiotemporally local). It is however important to understand, that one can map approximately (e.g. mapping the small scale spatial average signals of LDR and LDR* to each other) the HDR-based prediction, and then improve the LDR signal (since the HDR will have more precise textures, e.g. more precise gradations which may have been cored away in the LDR input). Even more so, this allows to send a more coarsely represented (i.e. with less bits) LDR signal (which would prima facie seem contrary to the layered prediction approach), and then reserve more bits for the HDR data. This is advantageous for systems like e.g. cable or internet which may not have too much bandwidth available, yet want optimal experience and quality for high end HDR applications. On the other hand, they need to continue servicing legacy systems. A fully legacy system may then get LDR data of some lower quality, e.g. more blocky. However, a settopbox may be more easily upgraded with software, or a consumer will more easily purchase a 150$ player than a 1500$ new t.v., so this scenario is interesting where the user has a new e.g. BD player with the system of FIG. 6, yet a classical LDR display 200. The inverse tone mapping unit 634 then generates a higher quality LDR signal QLDR1 from all available data of the LDR and HDR grading, which has less block artefacts etc.

Another processing which can optionally be done (and also in a separate system) is by the image processor 635. It may e.g. add spatial textures selected from the HDR grading to selected regions of the LDR signal, to make it even more crisp, yielding QLDR2. Of course also more complicated functions to derive a final driving signal from all available picture data may be employed, e.g. the input LDR signal and the QLDR1 signal may be mixed, based on e.g. a quality analysis (e.g. looking at whether the underlying texture is a smooth gradient, or complex, etc.).

Figure 7:
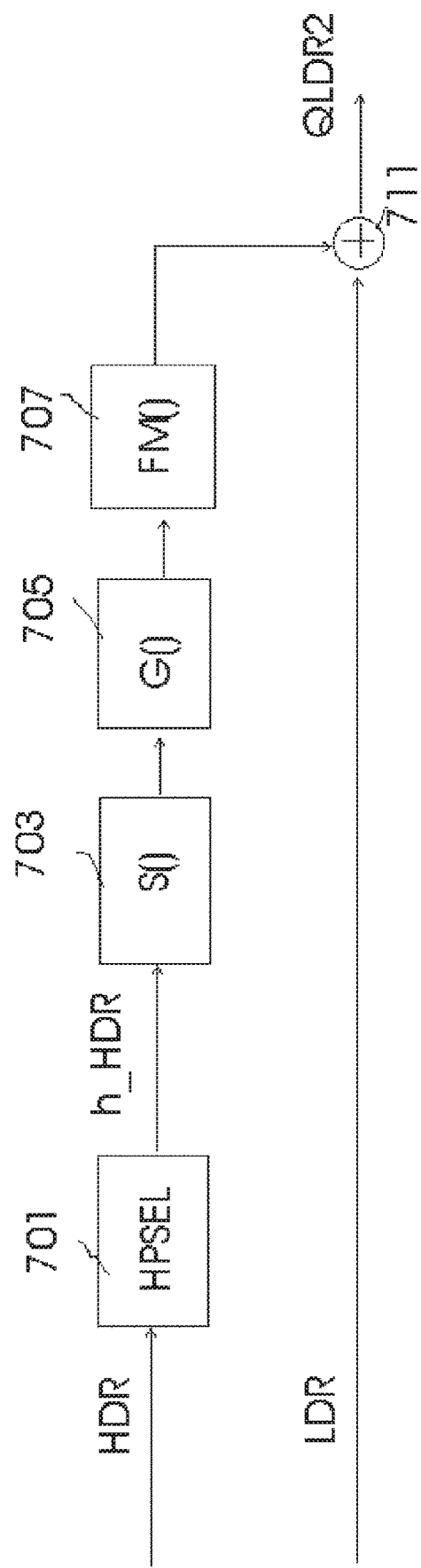
FIG. 7 schematically illustrates another example of improving an LDR grade compared to an LDR grade which was made available, and which QLDR2 may be used e.g. to drive a somewhat higher peak brightness display (e.g. 800 nit)

FIG. 7 schematically illustrates another example of the image processing which may be done on an LDR grading having the corresponding HDR grading, namely a sharpening. Since the HDR has better quality data, it is better to sharpen that signal (not to increase artefacts etc.). A high frequency isolation unit 701 derives a high frequency part h_HDR of the HDR signal (e.g. containing its microtexture). A spatial selection unit 703 determines for which pixels this data should be used. A transformation unit 705 determines how the micro-texture should be transformed to be applied in the LDR range, e.g. it may be a gain unit controlling the amount of local sharpness, and a mapper 707 will accurately map the grey values of this fine-texture to the underlying profile of the LDR object, whereafter it is added to the LDR by adder 711. The skilled person will realize how to realize such with alternative operations like e.g. unsharp masking, and how to similarly construct other image processing functions. E.g this method is useful to remove LDR contouring artefacts.

FIG. 8 schematically shows how different creator's rendering-views can be represented by different models dependent on values of certain parameters. E.g. as to the prediction function which maps the LDR respectively HDR grading to a common reference, one may encode this based on parameters like e.g. the dark color rendering capabilities of a (LDR) reference display (on which typically the LDR grade was determined), or display surround light level. The same may be done e.g. with the total OECF (e.g. OECF_TDR) with which average rendering behavior of the rendering system is modeled, i.e. judged, etc.

In this example the "black representability" axis determines how much of the darker colors can still be seen, e.g. under reflection of surround illumination on the display front plate. The level bad may indicate e.g. that 10% of all driving values cannot be discriminated from each other. Good may mean that e.g. the lowest 0.5% of the codes at least are still discriminatable. A low quality LDR system has both bad blacks and a low peak brightness. In this case a first model mod_1 is prescribed, which means that e.g. for the prediction of what exactly the LDR grade is like, this model takes into account severe lightening of darker colors by a typical grader. If some colors are still excessively dark, that must mean something. But on a display with better blacks, model 2 (mod_2) may project precisely those excessively dark colors, to excessively dark luminance parts of the used OECF, e.g. the gamma curve of such a better dynamic range display. Similarly, for higher peak brightnesses another strategy may be employed (mod_3). These strategies may be encoded in the metadata (e.g. in DAT_GRAD), and the (rough) boundaries between them e.g. as straight lines or parametric curves, etc. Encoding case-dependently the comparison models for differencing the LDR and HDR grade (and possibly also regrading specification algorithms), greatly facilitates intelligent switching between different intended behaviors.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

A computer program product version of the present embodiments as denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. It should be clear that with computer we mean any device capable of doing the data computations, i.e. it may also be e.g. a mobile phone. Also apparatus claims may cover computer-implemented versions of the embodiments.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of processing an image, comprising:
   obtaining a first graded picture, wherein the first graded picture has first pixels, wherein the first pixels have first luminances, wherein the first luminances fall within a first luminance dynamic range;
   obtaining data, wherein the data encodes a grading of a second graded picture, wherein the second graded picture has second pixels, wherein the second pixels have second luminances, wherein the second luminances fall within a second luminance dynamic range, wherein the second luminance dynamic range is different than the first luminance dynamic range;
   determining a grading difference data structure, wherein the grading difference data structure comprises a mathematical specification of a difference in grading between the first graded picture and the second graded picture for at least one region, wherein the grading difference data structure comprises a spatial regions of interest map, wherein the spatial regions of interest map indicates an amount of a difference of grading in each spatial region between the first graded picture and the second graded picture,
   wherein the region of interest map contains grey values for several pixel positions, wherein the determining of the mathematical specification of the difference in grading is based on at least the data which encodes the grading of the second graded picture; and
   deriving a third graded picture based on the spatial regions of interest map and on at least one of the first graded picture and the second graded picture;
   wherein the third graded picture has a grading that is different from a grading of the first graded picture and a grading of the second graded picture,
   wherein the first, second, and third graded pictures represent the same image content as each other, with regard to spatial position of image objects, and
   wherein the third graded picture is an intermediate image with an intermediate peak brightness between a first peak brightness of the first graded picture and a second peak brightness of the second graded picture.

2. The method of claim 1, wherein the luminances of third graded picture pixels in the third graded picture fall within at least one variance range around the luminances of the first graded picture pixels in the first graded picture, in which the third graded picture is a visual quality improvement of the first graded picture, according to a visual quality property, wherein fine-texture of the second graded picture is mapped into the first graded picture.

3. The method of claim 1, wherein the deriving of the third graded picture is based on obtained information on characteristics of a viewing environment.

4. The method of claim 1, wherein the deriving of the third graded picture is based on a user-controlled setting relating to display of the third graded picture.

5. The method of claim 1, comprising deriving the third graded picture based on the spatial regions of interest map and on only one of the first graded picture and the second graded picture.

6. An image processing apparatus, comprising:
a first input for input of a first graded picture, wherein the first graded picture has first pixels, wherein the first pixels have first luminances, wherein the first luminances fall within a first luminance dynamic range;
a second input for input of data, wherein the data encodes a grading of a second graded picture, wherein the second graded picture has second pixels, wherein the second pixels have second luminances, wherein the second luminances fall within a second luminance dynamic range, wherein the second luminance dynamic range is different than the first luminance dynamic range;
a processor circuit, wherein the processor circuit is configured to determine a grading difference data structure, wherein the grading difference data structure comprises a mathematical specification of a difference in grading between the first graded picture and second graded picture for at least one region, wherein the grading difference data structure comprises a spatial regions of interest map, wherein the spatial regions of interest map indicates an amount of a difference of grading in each spatial region between the first graded picture and the second graded picture, wherein the region of interest map contains grey values for several pixel positions; and
wherein the processor circuit is configured to derive a third graded picture based on the spatial regions of interest map and on at least one of the first graded picture and the second graded picture,
wherein the third graded picture has a grading that is different from a grading of the first graded picture and a grading of the second graded picture,
wherein the first, second, and third graded pictures represent the same image content as each other, with regard to spatial position of image objects, and
wherein the third graded picture is an intermediate image with an intermediate peak brightness between a first peak brightness of the first graded picture and a second peak brightness of the second graded picture.

7. The image processing apparatus of claim 6, wherein an image processing transformation is applied to the first graded picture based on at least the data which encodes the grading of the second graded picture.

8. The image processing apparatus of claim 6, wherein the processor circuit is further configured to apply an image processing transformation on at least one of the first graded picture and the second graded picture to obtain the third graded picture with a similar grading as the first graded picture but being of a better visual quality than the first graded picture.

9. The image processing apparatus of claim 6, wherein the processor circuit is configured to derive the third graded picture based on the spatial regions of interest map and on only one of the first graded picture and the second graded picture.

10. A non-transitory computer-readable recording medium having recorded thereon instructions, wherein the instructions, when executed by a processing circuit, cause the processing circuit to perform a method comprising:
obtaining a first graded picture, wherein the first graded picture has first pixels, wherein the first pixels have first luminances which fall within a first luminance dynamic range;
obtaining data, wherein the data encodes a grading of a second graded picture, wherein the second graded picture has second pixels, wherein the second pixels have second luminances, wherein the second luminances fall within a second luminance dynamic range, wherein the second luminance dynamic range is different than the first luminance dynamic range;
determining a grading difference data structure, wherein the grading difference data structure comprises a mathematical specification of a difference in grading between the first graded picture and the second graded picture for at least one region, wherein the grading difference data structure comprises a spatial regions of interest map, wherein the spatial regions of interest map indicates an amount of a difference of grading in each spatial region between the first graded picture and the second graded picture, wherein the region of interest map contains grey values for several pixel positions, wherein the determining of the mathematical specification of the difference in grading is based on at least the data which encodes the grading of the second graded picture; and
deriving a third graded picture based on the spatial regions of interest map and on at least one of the first graded picture and the second graded picture whether using pre-existing data or data derivable from the data encoding the grading of the second graded picture,
wherein the third graded picture has a grading that is different from a grading of the first graded picture and a grading of the second graded picture,
wherein the first, second, and third graded pictures represent the same image content as each other, with regard to spatial position of image objects, and
wherein the third graded picture is an intermediate image with an intermediate peak brightness between a first peak brightness of the first graded picture and a second peak brightness of the second graded picture.

11. The non-transitory computer-readable recording medium of claim 10, wherein the method comprises deriving the third graded picture based on the spatial regions of interest map and on only one of the first graded picture and the second graded picture.

12. A method of deriving, by an image processing integrated circuit, a third graded picture, wherein the third graded picture is an intermediate image with an intermediate peak brightness between a first peak brightness of a first graded picture and a second peak brightness of a second graded picture, the method comprising:

reading the first graded picture, wherein the first graded picture has first pixel luminances within a first luminance dynamic range;

obtaining data, wherein the data encodes a grading of a second graded picture, wherein the second graded picture has second pixel luminances within a second luminance dynamic range, wherein the first luminance dynamic range is greater than the second luminance dynamic range;

determining a grading difference data structure, wherein the grading difference data structure comprises a spatial regions of interest map, wherein the spatial regions of interest map indicates an amount of a difference of grading in each spatial region between the first graded picture and the second graded picture, wherein the region of interest map contains grey values for several pixel positions; and calculating the third graded picture on the basis of the first graded picture and the spatial regions of interest map.

13. The method of claim 12, wherein the determining of the grading difference data structure is done based on the data which encodes the grading of the second graded picture.

14. The method of claim 12, wherein the data encoding the grading of the second graded picture is received via one of: metadata associated with the first graded picture, a memory, blu-ray disk, or a video cable.

15. The method of claim 12, wherein the method is performed by an image processing integrated circuit (IC) of a television display.

16. The method of claim 12, wherein the method is performed by an image processing integrated circuit (IC) of a set-top-box.

17. The method of claim 12, comprising calculating the third graded picture based on the spatial regions of interest map and on only one of the first graded picture and the second graded picture.

* * * * *